United States Patent
Krueger

(10) Patent No.: US 7,505,200 B2
(45) Date of Patent: Mar. 17, 2009

(54) PHASE SHIFT METHOD AND APPARATUS FOR IMPLEMENTING PHASE-CONTRAST OR MODULATION-CONTRAST OBSERVATION ON MICROSCOPES

(75) Inventor: Ralf Krueger, Griedel (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 758 days.

(21) Appl. No.: 10/605,492

(22) Filed: Oct. 2, 2003

(65) Prior Publication Data
US 2004/0120029 A1  Jun. 24, 2004

(30) Foreign Application Priority Data
Oct. 2, 2002  (DE) ................... 102 45 974

(51) Int. Cl.
*G02B 21/32* (2006.01)
(52) U.S. Cl. ........................ 359/370; 359/384
(58) Field of Classification Search ............... 359/370, 359/384
See application file for complete search history.

(56) References Cited

U.S. PATENT DOCUMENTS

| | | | |
|---|---|---|---|
| 4,200,353 A | 4/1980 | Hoffman | 350/13 |
| 4,200,354 A | 4/1980 | Hoffman | 350/13 |
| 4,407,569 A | 10/1983 | Piller et al. | 350/509 |
| 5,684,631 A * | 11/1997 | Greywall | 359/565 |
| 5,777,783 A * | 7/1998 | Endou et al. | 359/385 |
| 6,057,894 A * | 5/2000 | Kobayashi | 349/5 |
| 6,462,858 B1 * | 10/2002 | MacDonald et al. | 359/290 |
| 6,687,052 B1 * | 2/2004 | Wilson et al. | 359/385 |
| 2003/0132394 A1 * | 7/2003 | Wolleschensky et al. | 250/458.1 |
| 2004/0169925 A1 * | 9/2004 | Dultz et al. | 359/487 |

FOREIGN PATENT DOCUMENTS

| | | |
|---|---|---|
| DE | 2523463 A1 | 12/1975 |
| DE | 2523464 A1 | 3/1976 |
| EP | 0069263 A1 | 1/1982 |

* cited by examiner

*Primary Examiner*—Joshua L Pritchett
(74) *Attorney, Agent, or Firm*—Simpson & Simpson, PLLC

(57) ABSTRACT

The invention concerns an apparatus for implementing phase-contrast or modulation-contrast observation on microscopes with the aid of a modulator (7) arranged in each pupil plane in the observation beam path and containing at least one layer modifying the phase or amplitude, and of a stop (3) arranged in the illumination beam path. For stepless adaptation of the phase shift, the modulator (7) is mounted tiltably. The invention further concerns a method for implementing a defined phase shift.

9 Claims, 2 Drawing Sheets

PHASE SHIFT METHOD AND APPARATUS FOR IMPLEMENTING PHASE-CONTRAST OR MODULATION-CONTRAST OBSERVATION ON MICROSCOPES

CROSS REFERENCE TO RELATED APPLICATIONS

This application claims priority of the German patent application 102 45 974.6 filed Oct. 2, 2002, which is incorporated by reference herein.

FIELD OF THE INVENTION

The invention concerns an apparatus and a method for implementing phase-contrast or modulation-contrast observation on microscopes, with the aid of layer(s) arranged in each pupil plane in the observation beam path that modify the phase or amplitude, and of a stop arranged in the illumination beam path.

BACKGROUND OF THE INVENTION

When viewed with conventional incident light or transmitted light, non-absorbing microscopic specimens are not visible to the eye. The aforementioned apparatuses are used in order nevertheless to make structures of differing refractive index or differing thickness visible. Such structures of differing optical density that are not perceptible by the eye are generally referred to as phase specimens.

EP 069 263 A1, for example, describes one such phase contrast device. It substantially comprises an annular segment stop in the illumination unit that is imaged onto a phase ring in the objective. The outside diameter of the phase ring constitutes the diameter of the corresponding pupil. The transmission and phase of the rotationally symmetrical phase ring are predefined.

Contrast modulation microscopes based on Hoffman modulation contrast (HMC) are described in German Unexamined Applications DE 25 23 463 A1 and DE 25 23 464 A1. These possess a slit-shaped illumination stop, in the region of the condenser pupil, which is imaged onto a modulator in the objective exit pupil. The modulator comprises three strip-shaped zones of differing transmissivity that, in the embodiment corresponding to the existing art, exhibit no phase shift with respect to each other.

For simplification and in order to achieve a clearer presentation, the statements hereinafter will refer exclusively to the term "modulator." This term encompasses on the one hand a modulator such as the one also described in the Unexamined Applications relating to HMC, and on the other hand to the phase ring such as the one known from the aforesaid EP 069 263 A1. Although the two components do not have identical functions, their effect is nevertheless comparable for purposes of the invention. In addition, in multifunctional microscopes they are already integrated into the same assembly. In such cases, the idea of the invention is of course also applicable to the entire assembly.

A substantial disadvantage of systems corresponding to the existing art is the fact that the phase shift between the zero-order diffraction and higher diffraction orders is almost impossible to adapt in specimen-specific fashion. DE 25 23 463 A1, for example, discloses an adaptation of phase by varying the choice of material for the modulator; but this as a rule requires modification of the microscope, and is very difficult to perform during normal utilization of the microscope. In addition, the fact that the materials of the modulator are predefined means that adaptation is possible only in predefined steps, and certainly not in continuous fashion. Acquisition of a large number of different modulators moreover entails considerable cost.

In order to achieve optimum contrast for a given geometry and transmissivity of the modulators, however, it is absolutely necessary for the phase also to be optimally adapted. When HMC is used, for example, to observe specimens that exhibit both large phase shifts and slight absorption, it is advantageous to introduce a phase shift in order to minimize halo effects. For very small phase specimens at the limits of detectability, it is furthermore advantageous to shift the phase through approximately 90 degrees in order to increase contrast.

SUMMARY OF THE INVENTION

It is the object of the invention to develop apparatuses for the implementation of phase-contrast or modulation-contrast observation on microscopes in such a way as to make possible a continuous phase shift during utilization of the microscope without the use of a large number of different modulators.

The independent patent claims describe how this object is achieved according to the present invention. Developments of the invention are the subject matter of the dependent claims.

According to the present invention, in order to achieve a defined phase shift from the zero-order diffraction to higher diffraction orders, the modulator is mounted tiltably in the plane conjugated with the objective exit pupil. In the context of strip-shaped modulators, the tilt is preferably accomplished in the direction of the modulator strips. By setting different tilt angles, correspondingly different phase shifts can be implemented. If the angular adjustment is performed continuously, a continuous modification of the phase shift can also be implemented.

In a preferred embodiment of the invention, specifically in the context of investigations in white light, it is advantageous that the phase is varied uniformly over the observed spectrum in order to prevent chromatic haloes on the structures being observed. This spectral phase consistency is achieved by the use of materials having differing dispersion.

In a further advantageous embodiment of the invention, the layers of the modulator are configured in such a way that the greatest possible phase shift is already achieved by a slight tilt.

This is achieved by the use of layers having high refractive indices or by working with glass plates rather than with layers that are created by vacuum deposition methods. By way of a targeted search it is easy to find, from the plurality of glasses, those having the necessary refractive index profiles and dispersions. If, for example, N-K5 glass is used in one modulator zone, and N-BK10 and N-BALF5 glasses at half-thickness in the adjacent zone, tilting then results in a spectrally very constant phase shift.

In a further advantageous embodiment of the invention, a phase shift is achieved by way of optical polarization means in combination with retardation plates.

In another advantageous embodiment of the invention, a combined assembly containing at least one modulator (as also described in the Unexamined Applications relating to HMC), and the phase ring as known from EP 069 263 A1, is implemented. Selectably, one modulator or the phase ring is mounted tiltably individually or together.

Also described is a method for implementing a defined phase shift in the context of phase-contrast or modulation-contrast observation on microscopes with the aid of phase- or amplitude-modifying layer(s) arranged in each pupil plane in the observation beam path, and of a stop arranged in the illumination beam path. The layer arranged in the observation beam path is tilted in the plane conjugated with the objective exit pupil.

BRIEF DESCRIPTION OF THE DRAWINGS

The invention will be described below on the basis of exemplary embodiments with reference to the schematic drawings, in which.

DETAILED DESCRIPTION OF THE INVENTION

Figure 1:
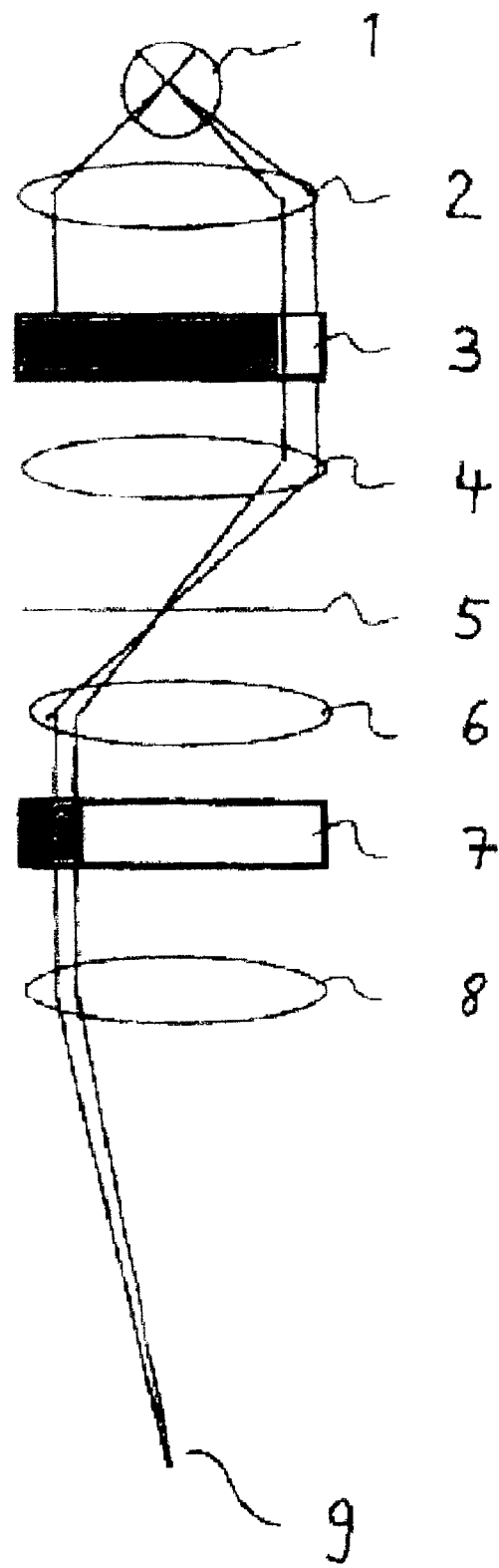
FIG. 1 shows a general embodiment of the invention.

FIG. 1 depicts an arrangement according to the present invention in greatly simplified form. The light of a light source 1 is incident via a collector 2 onto a stop 3 which is arranged in the condenser pupil. Located farther along in the beam path to intermediate image 9 are condenser 4, specimen 5, an objective 6, a modulator 7 which is arranged in the objective pupil, as well as a tube lens 8. According to the present invention, modulator 7 is arranged tiltably. Since a plurality of different mechanical solutions are known for tilting, depiction thereof was omitted. In this specific exemplary embodiment, stop 3 is embodied as a slit stop. Modulator 7 is a strip-shaped modulator matched thereto. Other embodiments of the stop and modulator are, of course, also possible.

Figure 2:
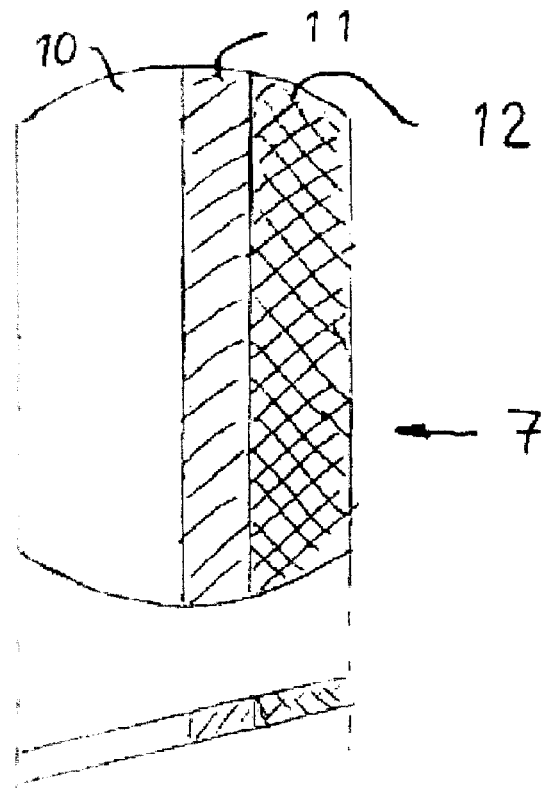
FIG. 2 shows a modulator.

FIG. 2 shows, by way of example, a modulator 7 that can be used in an apparatus according to the present invention. A plan view of the modulator is depicted in the upper part of FIG. 2, and a side view below it. In the plan view, the regions of differing transmissivity of region 10 are, for example, 100%, the transmissivity of region 11 is 20%, and the transmissivity of region 12 is 0%.

Figure 3:
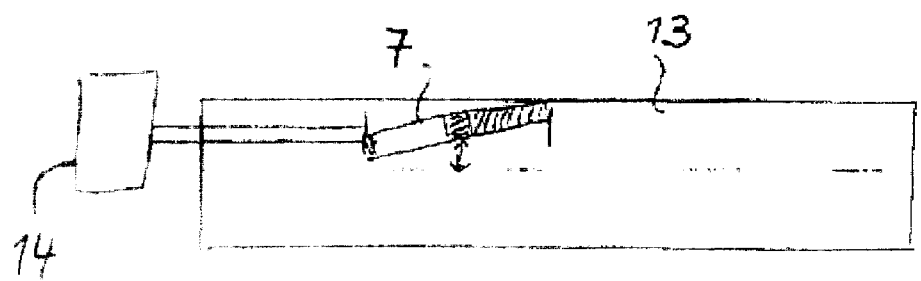
FIG. 3 shows a modulator with tilting apparatus.

FIG. 3 shows a modulator together with a tilting apparatus. A housing part 13 of the microscope receives modulator 7. Tilting of the modulator is accomplished by means of a mechanical tilting apparatus 14 which can be displaced by means of an actuation element. This actuation element can be, for example, an adjusting screw or also an electric motor, a piezoelement, or any other mechanical motion element.

PARTS LIST

1 Light source
2 Collector
3 Stop
4 Condenser
5 Specimen
6 Objective
7 Modulator
8 Tube lens
9 Intermediate image
10 Region having 100% transmissivity
11 Region having 20% transmissivity
12 Region having 0% transmissivity
13 Housing part
14 Mechanical tilting apparatus

What is claimed is:

1. An apparatus for implementing phase-contrast or modulation-contrast observation on microscopes with the aid of a modulator arranged in each pupil plane in the observation beam path and containing at least one layer modifying the phase or amplitude, and of a stop arranged in the illumination beam path, wherein the modulator is mounted dynamically tiltable and wherein at least a portion of the at least one layer modifying the phase or amplitude is transmissive.

2. The apparatus as defined in claim 1, wherein the at least one layer of the modulator is configured in such a way that the greatest possible phase shift is already achieved by a slight tilt.

3. The apparatus as defined in claim 2, wherein the modulator possesses a defined variable layer configuration.

4. The apparatus as defined in claim 1, wherein the at least one layer comprises glass plates of various glasses.

5. The apparatus as defined in claim 1, wherein the modulator possesses a defined variable layer configuration.

6. The apparatus as defined in claim 1, wherein the modulator possesses a defined variable layer configuration.

7. An apparatus for implementing phase-contrast or modulation-contrast observation on microscopes with the aid of a modulator arranged in each pupil plane in the observation beam path and containing at least one layer modifying the phase or amplitude, and of a stop arranged in the illumination beam path, wherein for phase shifting, optical polarization means in combination with retardation plates are present and wherein the modulator is mounted dynamically tiltable and at least a portion of the at least one layer modifying the phase or amplitude is transmissive.

8. An apparatus for implementing phase-contrast or modulation-contrast observation on microscopes with the aid of a modulator arranged in each pupil plane in the observation beam path and containing at least one layer modifying the phase or amplitude, and of a stop arranged in the illumination beam path, wherein various modulators are arranged on a carrier in a manner introducible into the beam path of the microscope and are selectably mounted, dynamically tiltable individually or dynamically tiltable together with the carrier, on that carrier and wherein at least a portion of the at least one layer modifying the phase or amplitude is non-reflective.

9. A method for implementing a defined phase shift in the implementation of phase-contrast or modulation-contrast observation on microscopes with the aid of a modulator arranged in each pupil plane in the observation beam path and containing at least one layer modifying the phase or amplitude, and of a stop arranged in the illumination beam path of the microscope, wherein the modulator is dynamically tilted and wherein the at least one layer modifying the phase or amplitude is transmissive.

* * * * *